United States Patent [19]

Yoneyama et al.

[11] Patent Number: 5,289,964
[45] Date of Patent: Mar. 1, 1994

[54] FLUXLESS SOLDERING PROCESS

[75] Inventors: Takao Yoneyama, Gifu; Katsuhiro Izuchi, Anjo, both of Japan

[73] Assignee: Nippondenso Co., Ltd., Kariya, Japan

[21] Appl. No.: 915,623

[22] Filed: Jul. 21, 1992

[30] Foreign Application Priority Data

Jan. 23, 1990 [JP] Japan .................................. 2-11837

[51] Int. Cl.$^5$ .............................................. B23K 1/008
[52] U.S. Cl. .................................. 228/122.1; 228/220
[58] Field of Search .............. 228/122, 123, 124, 220, 228/188, 263.12

[56] References Cited

U.S. PATENT DOCUMENTS

| 2,330,062 | 9/1943 | Lempert | 228/122 M |
| 2,897,583 | 8/1959 | Patrichi | 228/188 X |
| 3,487,536 | 1/1970 | Goldstein | 228/124 M |
| 4,331,253 | 5/1982 | Gordon et al. | 29/588 |
| 5,048,744 | 9/1991 | Chang et al. | 228/123 |
| 5,121,871 | 6/1992 | Beavis et al. | 228/124 X |

FOREIGN PATENT DOCUMENTS

| 55-19864 | 2/1980 | Japan . |
| 57-161528 | 10/1982 | Japan . |
| 62-148828 | 7/1987 | Japan . |
| 63-126689 | 5/1988 | Japan . |
| 3-8556 | 1/1991 | Japan . |
| 3-218950 | 9/1991 | Japan . |

OTHER PUBLICATIONS

R & D Magazine, Cahners Publishing Company, U.S.A.

*Primary Examiner*—Kenneth J. Ramsey
*Attorney, Agent, or Firm*—Cushman, Darby & Cushman

[57] ABSTRACT

A fluxless soldering process comprising the steps of: preparing first and second members to be bonded by soldering, the first member having a bonding surface with a higher solder-wettability and the second member having a bonding surface with a lower solder-wettability; placing the second member with the bonding surface thereof facing upward, a solder foil on the bonding surface of the second member, and the first member on the solder foil and with the bonding surface thereof facing downward, to form an assembly; heating the assembly in a reducing atmosphere to fuse the solder foil, thereby forming a molten solder between the first and second members; and cooling the assembly to solidify the molten solder, thereby bonding the first and second members.

9 Claims, 8 Drawing Sheets

| PROCESS | BEFORE SOLDERING → AFTER SOLDERING | | | SOLDER—WETTING | | |
|---|---|---|---|---|---|---|
| | | (PHOTOGRAPH) | (SKETCH) | SURFACE CONDITION | SOLDER FLOW | BOND |
| CONVENTIONAL | GLASS BASE 0.07g (γ=950)  METAL STEM (γ=1560) | | GAS BUBBLE (VOID) GLASS BASE / SOLDER / METAL STEM | POOR | POOR | POOR |
| | | | | GOOD | GOOD | VERY GOOD |
| INVENTION | METAL STEM 1.33g (γ=1560)  GLASS BASE (γ=950) | | METAL STEM / SOLDER / GLASS BASE | GOOD | POOR | GOOD |
| | | | | POOR | GOOD | GOOD |

FLUXLESS SOLDERING PROCESS

BACKGROUND OF THE INVENTION

Field of the Invention

The present invention relates to a fluxless soldering process advantageously applicable to bonding of small areas by not using a soldering flux, to provide a high gastightness required for, for example, a pressure sensor unit and the like.

Description of the Related Art

A pressure sensor unit has a soldered bond having a cross-sectional dimension as small as about 0.5 mm in terms of a minimum bond wall thickness, for example, and must have a high gastightness of a gas leak rate of $1 \times 10^{-11}$ atm-cc/s or less. In response to this, a good solder-wettability is conventionally ensured by applying a soldering flux on the bonding surfaces of members to be bonded by soldering.

When the bonding members are heated for fusing a solder, the applied flux thus heated generates a gas, which remains in the soldered bond and forms a void, which significantly reduces the gastightness of the soldered bond, thereby making it difficult to improve the gastightness of a small bond. The use of a soldering flux also essentially requires a process step of cleaning a flux residue of a soldered bond.

SUMMARY OF THE INVENTION

The object of the present invention is to provide a fluxless soldering process in which a soldering flux is not used, and thereby the gastightness of a small bond is improved so that a first member having a good solder-wettability such as metal and a second member having a relatively poor solder-wettability such as glass, having a thin coat of a metal oxide formed thereon, are soldered easily and with an excellent gastightness sufficient for fabricating a pressure sensor unit, for example.

To achieve the object according to the present invention, there is provided a fluxless soldering process comprising the steps of:

preparing first and second members to be bonded by soldering, the first member having a bonding surface with a higher solder-wettability and the second member having a bonding surface with a lower solder-wettability;

placing the second member with a bonding surface thereof facing upward, a solder foil on the bonding surface of the second member, and the first member on the solder foil and with a bonding surface thereof facing downward, to form an assembly;

heating the assembly in a reducing atmosphere to fuse the solder foil, thereby forming a molten solder between the first and second members; and cooling the assembly to solidify the molten solder, thereby bonding the first and second members.

The present invention facilitates the wetting of a less wettable second member, such as a glass member having a thin coat of a metal oxide formed thereon, by placing a more wettable first member on an upper position and the less wettable second member on a lower position to thereby impart the bonding surface of the less wettable member with a pressing force owing to the weight of the solder used and the weight of the first member placed thereon. The more wettable member also promotes wetting of the facing surface. These eliminate the imbalance in wetting by solder between the two members, and thereby substantially improves the solder-wettability of the bonding portion as a whole. Another advantage is obtained because any bubbles from a flux can be effectively removed from the bond.

DESCRIPTION OF THE PREFERRED EMBODIMENTS

An example of the present inventive process will be described with reference to the attached drawings.

EXAMPLE

Figure 1:
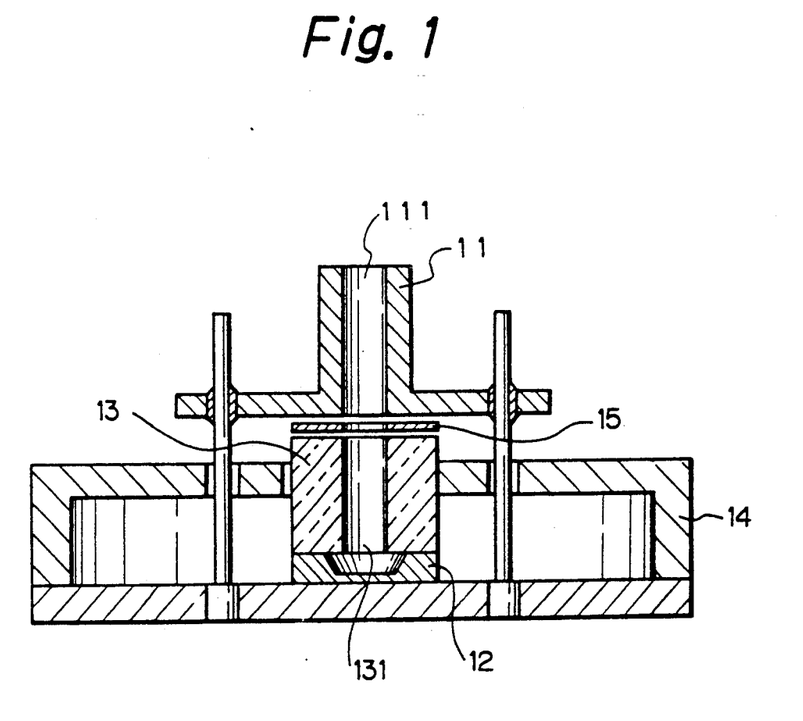
FIG. 1 shows, in sectional view, an arrangement for carrying out a fluxless soldering process according to the present invention.

FIG. 1 shows an arrangement which can be advantageously used for carrying out a fluxless soldering process according to the present invention when fabricating a pressure sensor unit having a small bonding area, in which a high level of gastightness of the bond is required.

A pressure sensor unit is fabricated by bonding a metal stem 11 with a glass base 13 on which a pressure sensor 12 composed of semiconductors and the other parts is mounted. The metal stem 11 has a pressure intake 111 formed therethrough along the center axis thereof; the glass base 13 has a pressure passage 131 formed therethrough along the center axis thereof and extending to the pressure sensor 12; the metal stem 11 and the glass base 13 are bonded by soldering in such a position that the pressure intake 111 and the pressure passage 131 are coaxially communicated so that a pressure to be measured is introduced in the pressure intake 111 and guided along the pressure passage 131 to the pressure sensor 12.

The metal stem 11 may be made of "42 alloy" (Fe 58%-Ni 42%, in nominal composition) and plated with Ni and Au in that order on the bonding surface; the glass base 13 may be made of "pyrex glass" (Corning Co.) and deposited with Ti, Ni and Au in that order on the bonding surface.

When carrying out bonding or soldering of the metal stem 11 with the glass base 13, the glass base 13, to which the pressure sensor 12 has been attached, is first fixed in a jig 14 in a position such that the attached pressure sensor 12 is located at the lower side and the open end of the pressure passage 131 of the glass base 13 is located at the upper side. The metal stem 11 is to be bonded to the upper end surface of the glass base 13 at which the pressure passage opens.

After the glass base 13 is thus fixed in the jig 14, a solder foil 15 is placed on the upper end surface of the glass base 13, and the metal stem 11 is then placed on the solder foil 15 to form an assembly composed of the glass base 13, the metal stem 11 and the solder foil 15 interposed between the glass base 13 and the metal stem 11. This assembly is fixed by the jig 14 as a whole.

The assembly is heated in a reducing atmosphere having a composition such as 30% hydrogen and 70% nitrogen by volume or more to a temperature of about from 250 to 300° C., for example, to fuse the solder foil and thereby solder the glass base 13 with the metal stem 11. A reducing atmosphere reduces and removes any oxides present on the bonding surfaces, and simultaneously prevents the bonding surface from being oxidized again during the heating for soldering.

In the conventional flux soldering process, particularly when a glass base of a small dimension is soldered with a metal stem of a larger dimension, an assembly to be soldered is prepared by placing the larger metal stem with a bonding surface thereof facing upward, i.e., against the direction of gravity, placing a solder foil on the bonding surface of the stem and placing the glass base on the solder foil and with a bonding surface thereof facing downward, i.e., in the direction of gravity. When this conventional assembly is used, a soldering flux is essential or indispensable to obtain a good solder-wetting and gastightness.

Figure 2A:
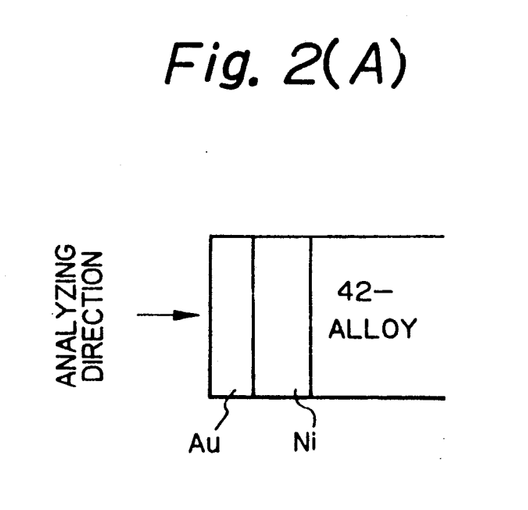
FIGS. 2(A) and 2(B) show the sub-surface structure and the Auger analysis of a metal stem, respectively.
Figure 2B:
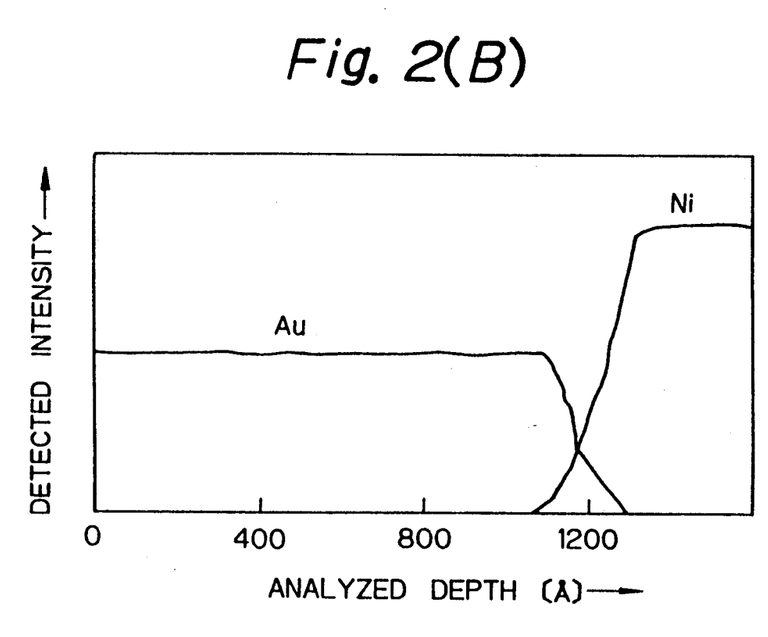
Figure 3A:
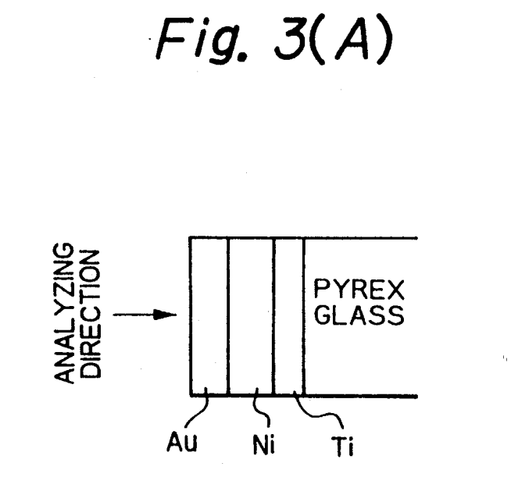
FIGS. 3(A) and 3(B) show the sub-surface structure and the Auger analysis of a glass base, respectively.
Figure 3B:
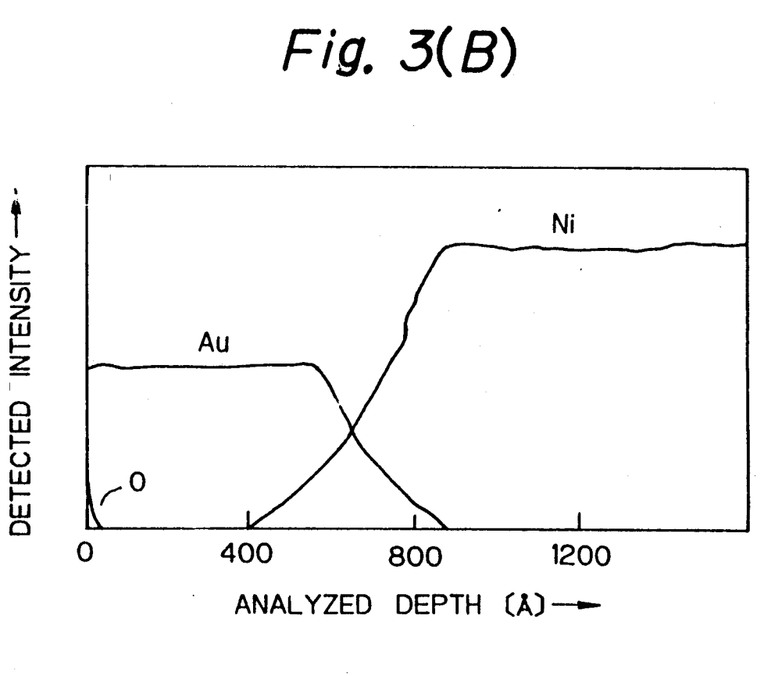

FIGS. 2 and 3 show a result of Auger analysis directed to the oxide layer formed on the bonding surfaces of a metal stem and a glass base prepared for soldering, respectively, in which FIGS. 2(A) and 3(A) show the sub-surface structure of a metal stem and a glass base, respectively, and FIGS. 2(B) and 3(B) show the Auger electron intensity as a function of the analyzed depth from the metal stem surface and the glass base surface, respectively.

It can be seen from FIGS. 2 and 3 that no oxide layer is detected from the stem surface whereas an oxide layer having a thickness of about from 10 to 15 Å is detected on the glass base surface, suggesting that the glass base is less wettable by solder in comparison with the metal stem; the detected oxide layer is considered to be formed during anodic bonding of the glass base with a pressure sensor comprising semiconductor devices and in a subsequent transfer step.

Figure 4A:
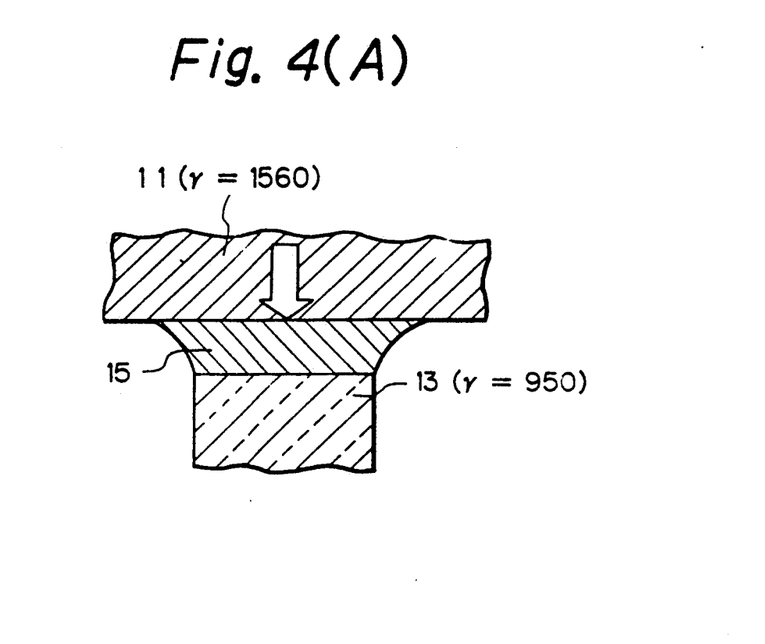
FIGS. 4(A) and 4(B) show, in sectional view, a glass base/metal stem assembly according to the present invention and the conventional soldering process, respectively.
Figure 4B:
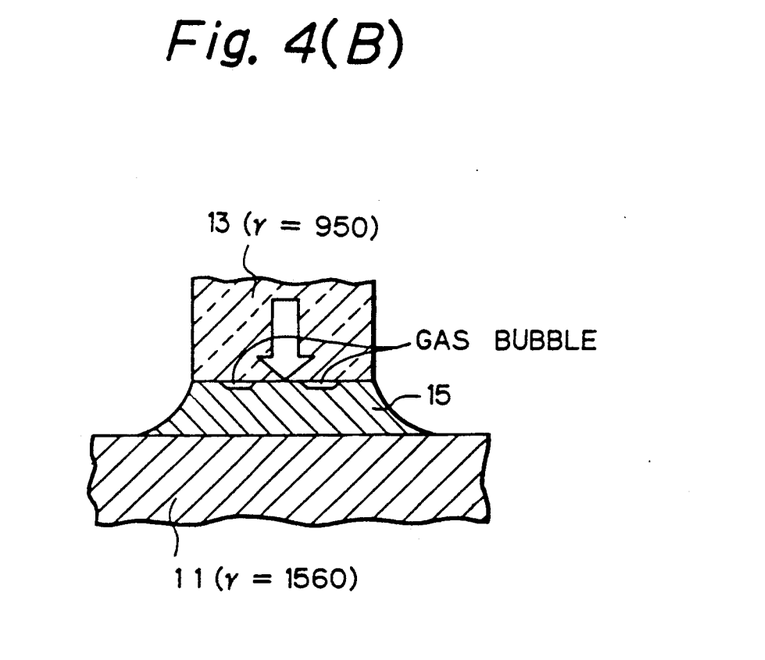

FIGS. 4(A) and 4(B) show a molten solder between the bonding surfaces of a metal stem and a glass base assembled according to the present invention (A), as shown in FIG. 1, and in the conventional manner (B), respectively. In both cases, soldering is carried out by heating the assembly having an inserted solder foil between the metal stem and the glass base in a reducing atmosphere of 30% hydrogen and 70% nitrogen by volume and under different loads applied on the bonding surface for studying the solder-wettability of the glass base surface. The symbol $\gamma$ shown represents surface tension, in dyne/cm, exerted on a bonding surface by the molten solder and a greater $\gamma$ value corresponds to a better solder-wettability.

Figure 5:
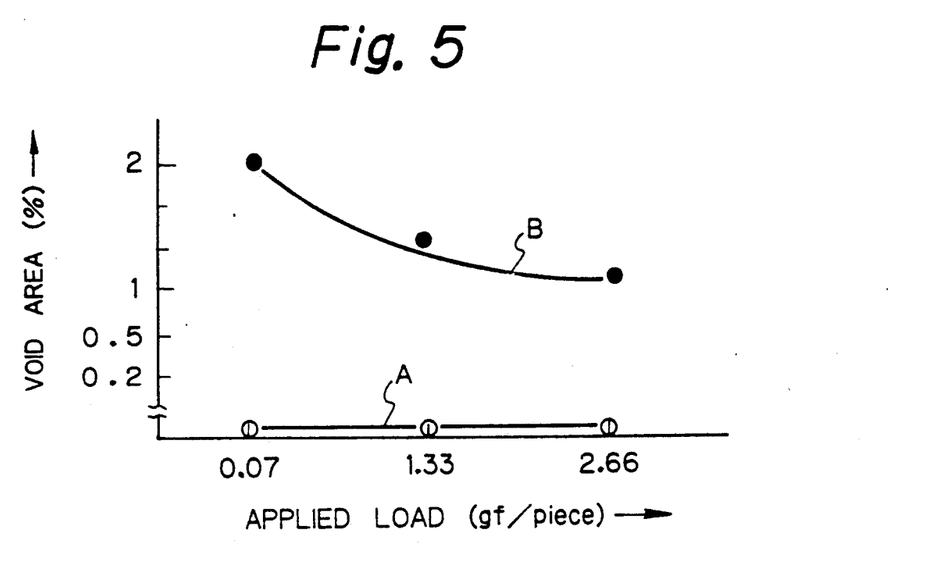
FIG. 5 shows the void area as a function of the applied load.
Figure 6:
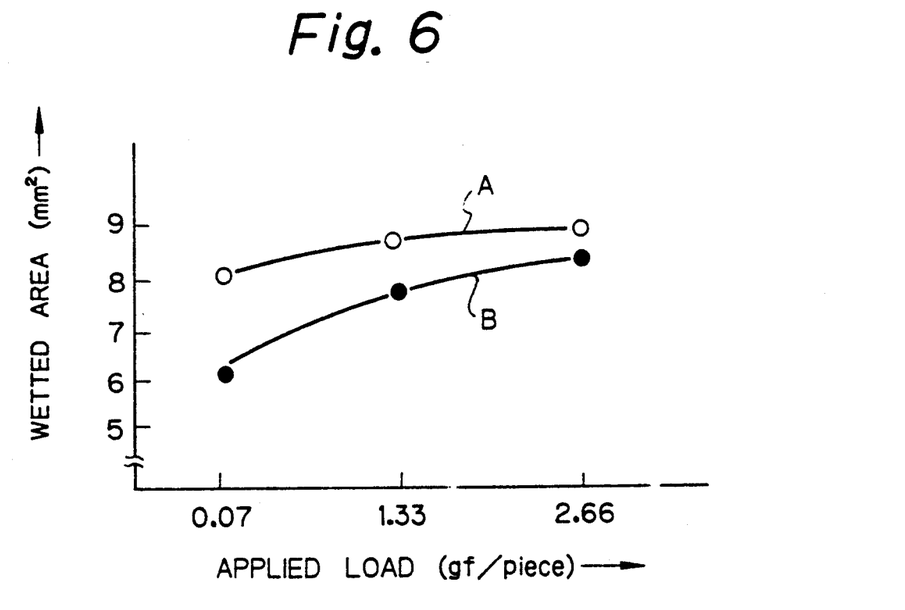
FIG. 6 shows the area wetted by a solder as a function of the applied load.

The thus-soldered bonds of FIGS. 4(A) and 4(B) were forcibly and carefully separated and the exposed surfaces were subjected to microscopic observation. The results are summarized in FIGS. 5 and 6, in which curve "A" represents the bond obtained by using the present inventive assembly shown in FIG. 4(A) and curve "B" represents the bond obtained by using the conventional assembly shown in FIG. 4(B).

The results show that, in comparison with the conventional assembly (B), the assembly (A) according to the present invention significantly reduces the void area of a soldered bond and also provides a greater area wetted by a solder (an area surrounded by the front line of spread solder), both suggesting that the present invention provides a remarkable improvement in solder-wettability.

When a first member such as a metal stem and a second member such as a glass base less wettable by a solder than the first member, are stacked one above the other with a solder foil interposed therebetween, the solder-wetting of the bonding surface of the lower member is facilitated by a load applied onto the bonding surface of the lower member owing to the weight of the upper member and the weight of the solder and by a balanced wetting of the upper and lower bonding surfaces owing to a promoted wetting of the facing surfaces. This consequently improves the solder-wettability of a bonding portion as a whole and provides the results shown in FIGS. 5 and 6, in which the wetting is facilitated in the bonding surface of the glass base placed on a lower side.

A pressure sensor unit was fabricated by assembling a metal stem 11 and a glass base 13 according to the present invention. A radioisotope leak test showed that the product has a good leakage rate less than $1 \times 10^{-11}$ atm-cc/s.

Figure 7:
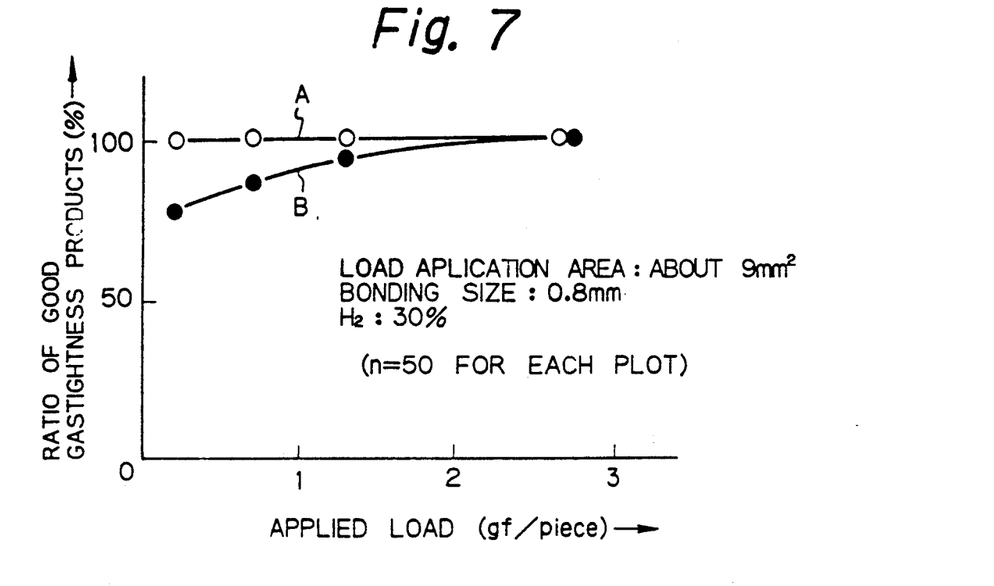
FIG. 7 shows the ratio of products having good gastightness as a function of the applied load.

FIG. 7 shows a relationship between the load applied on the bonding surface and the ratio of products having a good gastightness, in which the symbol "A" denotes the result obtained according to the present invention and the symbol "B" denotes the result obtained in the conventional process, when the bonding size was 0.8 mm in terms of a minimum bond wall thickness and the $H_2$ concentration of the soldering atmosphere was 30%. The result shows that an increase of the applied load facilitates the flow of solder and improves the solder-wettability to thereby improve the gastightness of a bond. However, a load greater than 3 gf/piece (loading area: 9 mm$^2$/piece) is not practically preferred because the solder layer becomes too thin.

Under the same applied load, the process according to the present invention improves the solder-wettability and thereby provides an improved gastightness of a soldered bond.

Figure 8:
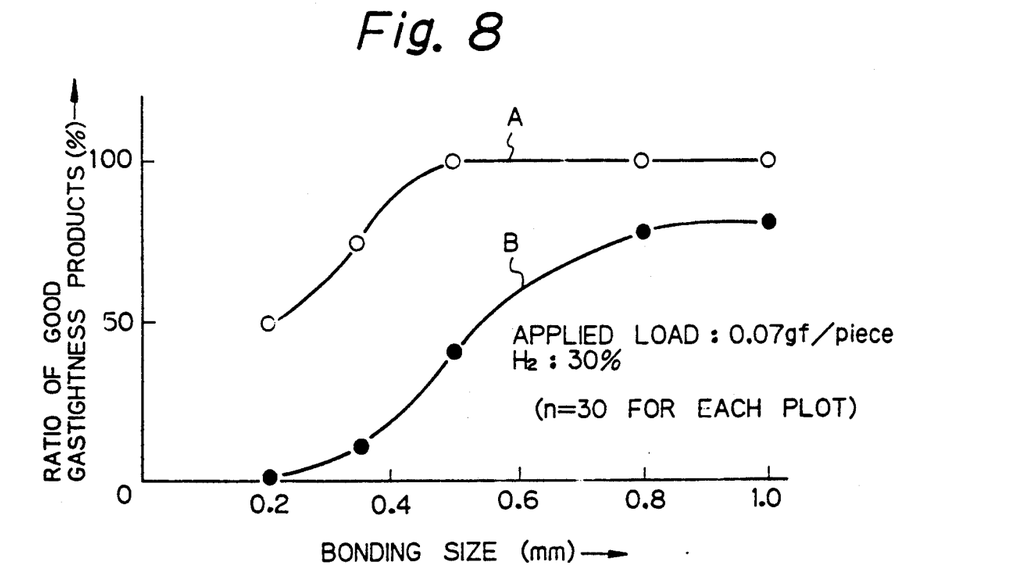
FIG. 8 shows the ratio of products having good gastightness as a function of the size of a bonding area.

FIG. 8 shows a relationship between the size of soldered bond in terms of a minimum bond wall thickness and the ratio of products having a good gastightness for the process according to the present invention (A) and the conventional process (B), when the applied load was 0.07 gf/piece and the $H_2$ concentration of the soldering atmosphere was 30%. Increasing of a bonding area is considered to be one measure for improving the gastightness of a bond but is practically limited by the requirements of the soldered product. It can be seen from FIG. 8 that the present invention provides an improved gastightness, when the bond cross-sectional dimension is as small as 1 mm or less, for example. It should also be noted that the greatest percentage of gas tight bonds of about 75% achieved by the conventional process (curve "B") with a bonding size of 1 mm can be attained with a smaller bonding size of about 0.4 mm according to the present invention (curve "A").

Figure 9:
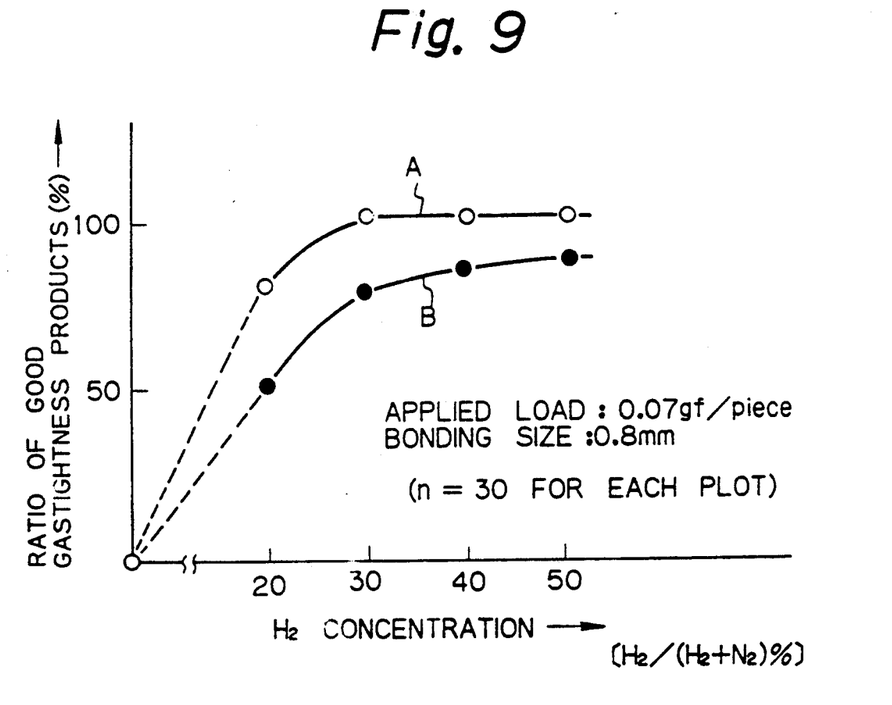
FIG. 9 shows the ratio of products having good gastightness as a function of the H: concentration of a soldering atmosphere.

FIG. 9 shows a relationship between the $H_2$ concentration of a soldering atmosphere and the ratio of products having a good gastightness, when the applied load acting upon the bonding surface was 0.07 gf/piece and the bond size was 0.8 mm. It can be seen from FIG. 9 that the solder-wettability is improved by increasing the $H_2$ concentration and thereby facilitating the reduction and removal of oxides from the bonding surface and the prevention of re-oxidation of the bonding surface and that, under the same $H_2$ concentration, the inventive process denoted by "A" provides an improved gastightness of a soldered bond in comparison with the conventional process denoted by "B".

In this example, a surface oxide layer formed on the glass base has a thickness of 15 Å at most, and therefore the $H_2$ concentration of 30% is considered sufficiently effective. When the surface oxide layer has a thickness greater than 15 Å, the $H_2$ concentration of a soldering atmosphere is preferably increased in accordance with the oxide layer thickness.

Figure 10:
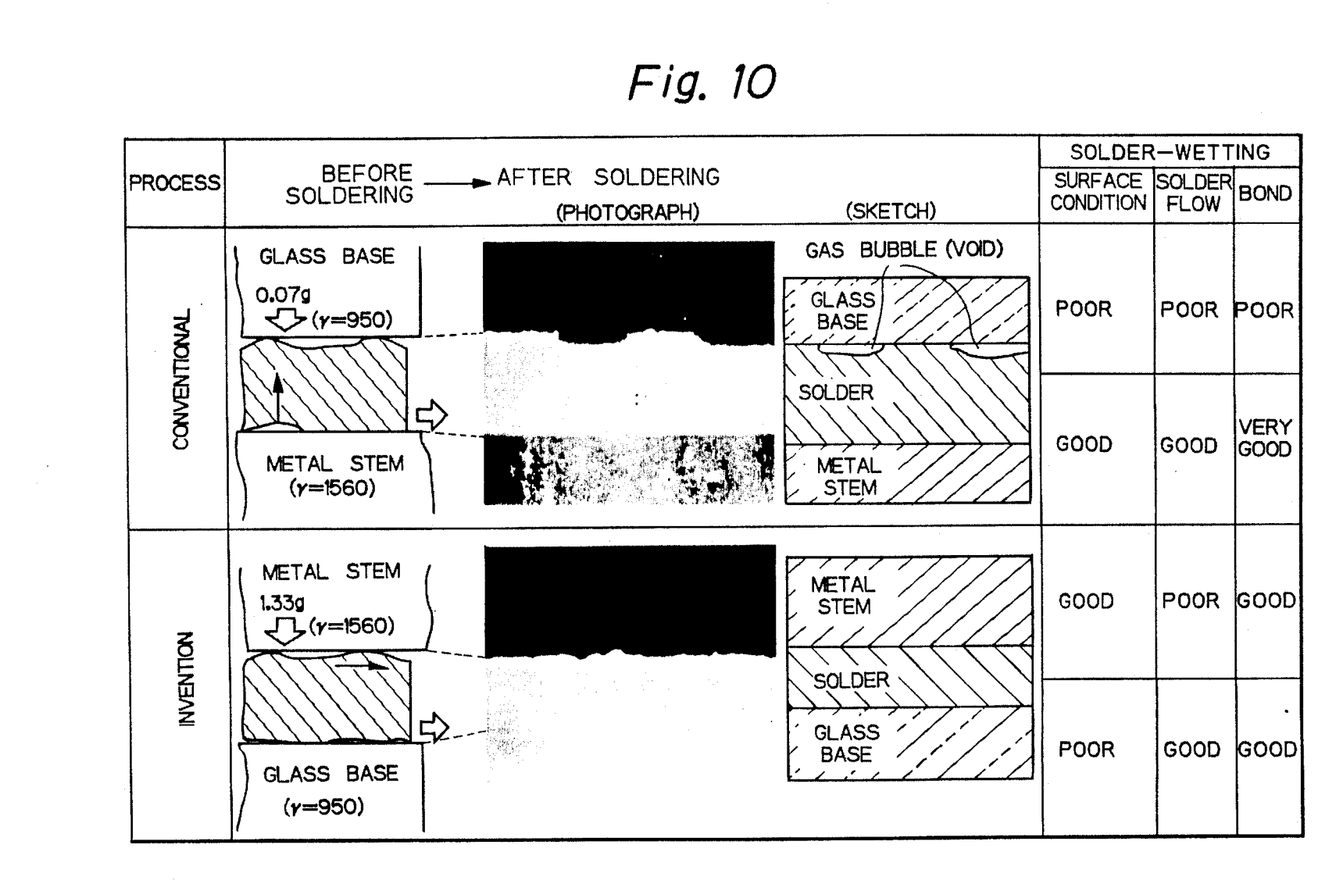
FIG. 10 shows a comparison between the soldered bonds obtained by the present invention and the conventional process.

FIG. 10 shows a comparison between the soldered bonds obtained by the present invention and the conventional process, respectively. When a solder is interposed between two bonding surfaces and fused by heating, a force effective for flowing the molten solder includes a contribution by the weight of the solder, which facilitates the solder flow over the bonding surface located on the lower side in comparison with the solder flow over the bonding surface located on the upper side. Any difference between the two bonding surfaces affects the solder flow over these bonding surfaces.

In the conventional process, in which a less wettable glass base is located above a better wettable metal stem, the contribution of the solder weight, in addition to the wettable nature of the lower metal stem, facilitates the solder flow over the lower bonding surface, thereby increasing the imbalance in wetting between the upper glass base and the lower metal stem and does not improve the solder-wettability of a bond as a whole.

Moreover, when gas bubbles are taken in the molten solder, bubbles present on the lower bonding surface are easily lifted off from the lower bonding surface by buoyancy as the wetting by solder proceeds, but bubbles present on the upper bonding surface, which is less wettable, are pressed against the upper bonding surface by buoyancy and retained thereon in a soldered bond as can be seen in FIG. 4(B).

In a process according to the present invention, soldering is carried out with a less wettable glass base 13 located below a more wettable metal stem 11 to facilitate the solder-wetting of the less wettable glass base by the weight of solder and by a wet-promoting effect of the facing surface, thereby eliminating the imbalance in wetting between the upper and lower bonding surfaces and improving the solder-wettability of a bond as a whole.

Even when gas bubbles are taken in the molten solder, the thus-improved wettability of the bonding surface of the lower glass base allows the bubbles to easily escape the lower bonding surface by buoyancy and the subsequent space is readily filled with the surrounding molten solder. Bubbles present on the upper bonding surface are easily removed from the molten solder by the solder flow owing to the wetting nature of the upper bonding surface.

In the hereinabove-described example according to the present invention, the heating in a hydrogen-containing atmosphere is carried out at a temperature higher than the melting point of 236° C. of the solder used, i.e., in the range of about from 250 to 300° C., because a higher heating temperature would cause an excessive diffusion of the solder, particularly the Sn contained therein, and thereby reduce the bonding strength at the interface between the layers of Ni and Ti deposited on the glass substrate and because a lower heating temperature would result in a poor solder-wetting of the bonding surfaces.

Note that, according to the present invention, a less wettable member may be larger in dimension than a more wettable member, although the former is smaller than the latter in the above-described example. The essential feature of the present invention is that a less wettable member is placed on the lower side with respect to a more wettable member.

As hereinabove described, the present invention provides a fluxless soldering process which enables a small bonding area to be solder-bonded by heating in a reducing atmosphere without the use of a soldering flux to form a sound bond advantageously applicable to a soldering process in which a small area must be bonded with a high gastightness and bond strength, such as the fabrication of a pressure sensor unit.

The present invention provides another advantage in that, because a soldering flux is not used, a process step of removing the flux residue from a soldered bond can be omitted, which contributes to environmental protection by not using harmful chemicals such as fluorohydrocarbons.

We claim:

1. A fluxless soldering process comprising the steps of:
   preparing first and second members to be bonded by soldering, the first member having a bonding surface with a higher solder-wettability and the second member having a bonding surface with a lower solder-wettability and having a cross-sectional area smaller than that of the bonding surface of the first member;
   placing the second member with the bonding surface thereof facing upward, a solder foil on the bonding surface of the second member, and the first member on the solder foil with the bonding surface thereof facing downward, to form an assembly;
   heating the assembly in a reducing atmosphere to fuse the solder foil, thereby bonding the first and second members.

2. A fluxless soldering process according to claim 1, wherein the bonding surface of the second member is covered with a thin oxide film formed thereon.

3. A fluxless soldering process according to claim 2, wherein the second member is prepared by depositing a metal layer on a glass material.

4. A fluxless soldering process according to claim 1, wherein the first member is made of a metal.

5. A fluxless soldering process according to claim 1, wherein the reducing atmosphere is composed of a gas mixture of hydrogen and nitrogen.

6. A fluxless soldering process according to claim 2, wherein the reducing atmosphere is composed of a gas mixture of hydrogen and nitrogen.

7. A fluxless soldering process according to claim 6, wherein the oxide film on the bonding surface of the second member has a thickness of less than about 15 Å and the gas mixture has a composition of more than 30% hydrogen with the rest being nitrogen.

8. A fluxless soldering process according to claim 1, wherein the bonding surface of the second member has a size of from about 0.4 mm to about 1 mm in terms of a minimum cross-sectional dimension.

9. A fluxless soldering process according to claim 3, wherein the heating is carried out at a temperature of from about 250° C. to about 300° C.

* * * * *